United States Patent
Prenger et al.

(10) Patent No.: US 9,628,512 B2
(45) Date of Patent: Apr. 18, 2017

(54) MALICIOUS RELAY DETECTION ON NETWORKS

(71) Applicant: Vectra Networks, Inc., San Jose, CA (US)

(72) Inventors: Ryan James Prenger, Oakland, CA (US); Nicolas Beauchesne, Miami Beach, FL (US); Karl Matthew Lynn, Winter Garden, FL (US)

(73) Assignee: Vectra Networks, Inc., San Jose, CA (US)

( * ) Notice: Subject to any disclaimer, the term of this patent is extended or adjusted under 35 U.S.C. 154(b) by 0 days.

(21) Appl. No.: 14/644,186

(22) Filed: Mar. 10, 2015

(65) Prior Publication Data
US 2015/0264083 A1 Sep. 17, 2015

Related U.S. Application Data

(60) Provisional application No. 61/951,487, filed on Mar. 11, 2014.

(51) Int. Cl.
*H04L 29/06* (2006.01)
*G06F 17/30* (2006.01)

(52) U.S. Cl.
CPC .... *H04L 63/1475* (2013.01); *G06F 17/30598* (2013.01); *H04L 63/1408* (2013.01); *H04L 63/1466* (2013.01)

(58) Field of Classification Search
CPC ..... H04L 63/1408; H04L 63/14; H04L 63/16; H04L 63/25; H04L 63/1441; G06F 17/30598
See application file for complete search history.

(56) References Cited

U.S. PATENT DOCUMENTS

| 7,634,557 B2 | 12/2009 | Moore et al. | |
| 8,843,627 B1 * | 9/2014 | Baldi | H04L 43/026 709/224 |
| 2005/0102414 A1 * | 5/2005 | Hares | H04L 45/00 709/232 |
| 2008/0077705 A1 * | 3/2008 | Li | H04L 47/10 709/236 |

(Continued)

FOREIGN PATENT DOCUMENTS

CA 2416629 A1 * 7/2004

OTHER PUBLICATIONS

N. Brownlee et al., Traffic Flow Measurement: Architecture, Oct. 1999, https://tools.ietf.org/pdf/rfc2722.pdf.*

(Continued)

*Primary Examiner* — Saleh Najjar
*Assistant Examiner* — Khang Do
(74) *Attorney, Agent, or Firm* — Vista IP Law Group, LLP

(57) ABSTRACT

A system and method for detecting malicious relay communications is disclosed. Network communications can be received and analyzed using such network components as a network switch. The received traffic can be parsed into sessions. Relay metadata can be extracted from the sessions and further be used to categorize the sessions into one or more types of relay metadata behaviors. Once a significant amount of sessions are detected an alarm may be triggered and/or alarm data may be generated for analysis by network security administrators.

27 Claims, 15 Drawing Sheets

(56) References Cited

U.S. PATENT DOCUMENTS

| | | | |
|---|---|---|---|
| 2009/0144408 A1* | 6/2009 | Wilf | H04L 41/12 709/224 |
| 2009/0154375 A1* | 6/2009 | Coskun | H04L 41/12 370/254 |
| 2012/0023572 A1 | 1/2012 | Williams, Jr. et al. | |
| 2013/0312054 A1* | 11/2013 | Wang | H04L 63/0236 726/1 |
| 2013/0315077 A1 | 11/2013 | Toshiaki et al. | |
| 2014/0047547 A1* | 2/2014 | Mahadik | H04L 63/1433 726/25 |
| 2014/0245374 A1* | 8/2014 | Deerman | H04L 63/20 726/1 |
| 2014/0325649 A1* | 10/2014 | Zhang | H04L 43/024 726/23 |

OTHER PUBLICATIONS

Ting-Fang Yen, Detecting Stealthy Malware Using Behavioral Features in Network Traffic, Aug. 2011, Carnegie University Mellon.*
International Search Report & Written Opinion dated Jun. 15, 2015 for PCT Appln. No. PCT/US15/19802.
International Preliminary Report on Patentability dated Sep. 13, 2016 for PCT Appln. No. PCT/US15/19802.

* cited by examiner

MALICIOUS RELAY DETECTION ON NETWORKS

CROSS-REFERENCE TO RELATED APPLICATION(S)

The present application claims the benefit of U.S. Provisional Application Ser. No. 61/951,487, filed on Mar. 11, 2014, titled "METHOD AND SYSTEM TO DETECT RELAY INTRUSIONS", the content of the aforementioned application is hereby incorporated by reference in its entirety.

BACKGROUND

In recent years, it has become increasingly difficult to detect malicious activity carried on networks. The sophistication of intrusions has increased substantially, as entities with greater resources, such as organized crime and state actors, have directed resources towards developing new modes of intrusions.

One fairly harmful type of intrusion pertains to the situation when an outside entity takes control of a host at a given company or organization. When this happens, the host can be controlled and used as a source of attacks against other targets or as a means to exfiltrate data from within the organization. What makes this type of attack difficult to detect is that it can be carried out over time and often is mistaken for "normal" network activity until data about the attack can be analyzed over longer periods of time.

This type of controlled attack may be implemented among criminals in the digital world, where a controlled internal host (e.g. infected computer inside an organization's network) is used in a botnet to carry out attacks on behalf of a bot master or to exfiltrate data from an internal source.

As is evident, there is a need for an approach to effectively and efficiently identify such scenarios where an outside entity uses a relay host to attack networks.

BRIEF DESCRIPTION OF THE DRAWING

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION

Various embodiments of the invention are directed to a method, system, and computer program product for detecting malicious relay communications on networks. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

One harmful type of intrusion pertains to the situation when an outside entity takes control of a host computer inside a company or organization. When this happens, the host can be controlled and used as a source for attacks against other targets or as a source to exfiltrate data from within the organization. What makes this type of attack difficult to detect is the attack could be carried out over time and often is mistaken as "normal" network behavior until the data can be analyzed over a longer period of time.

This type of control is often implemented among criminals in the digital world, where the controlled internal host is used in a botnet to carry out attacks on behalf of the bot master outside of the company network or to where the controlled internal host is used as part of a targeted attack to exfiltrate data from an internal source.

Figure 1A:
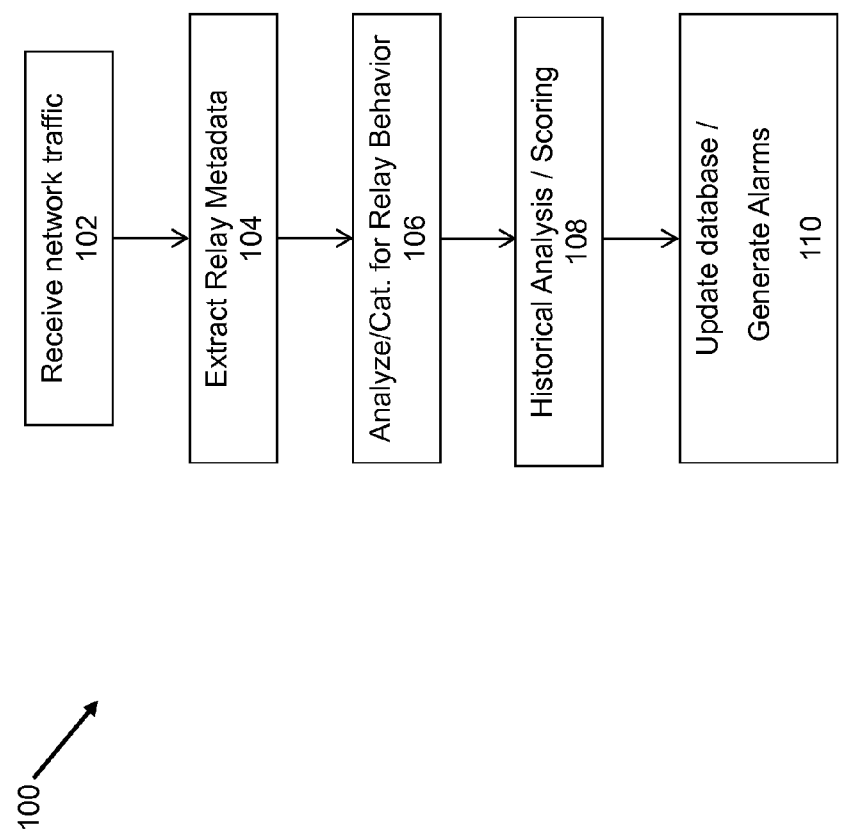
FIG. 1A-B shows a flowchart and system aspects for an approach for detecting network attacks that use relays, as according to some embodiments.

FIG. 1A illustrates a flowchart 100 for high-level approach for detecting relay attacks (e.g. network attacks that involve the use of relay hosts) using relay metadata, as according to some embodiments. At 102, traffic from the network may be received for analysis. In some embodiments (as described below) the network traffic may be received by tapping a network switch.

At 104, the network traffic may be analyzed for relay metadata. The relay metadata may, in some embodiments, comprise information that describes the network communications without requiring the content or the packets of the network communications to be inspected. Further, one or more relay metadata items may be extracted from the network communications and used for further analysis.

At 106, the relay metadata may be used to further analyze and/or categorize the network communications into known relay behaviors. The known relay behaviors may correspond to one or more behavior categories that are defined by characteristics such as flow direction, and statistical descriptions, as described in further detail below.

At 108, historical analysis and/or scoring may be conducted. As according to some embodiments, once a network communication (e.g. a session) is categorized or identified as a known relay behavior, past historical data concerning the involved hosts may be retrieved for further analysis. In some embodiments, the historical data is used with the newly categorized network behavior to score the involved hosts, or the likelihood that the network communication is part of a relay attack.

At 110, the new information regarding the analyzed network communications (e.g. scoring data) may be updated in a database. Further, in some embodiments, if the scored data indicates that the network communication is likely to be part of a relay attack, alarms may be generated to alert network administrators of the potential malicious activity.

Figure 1B:
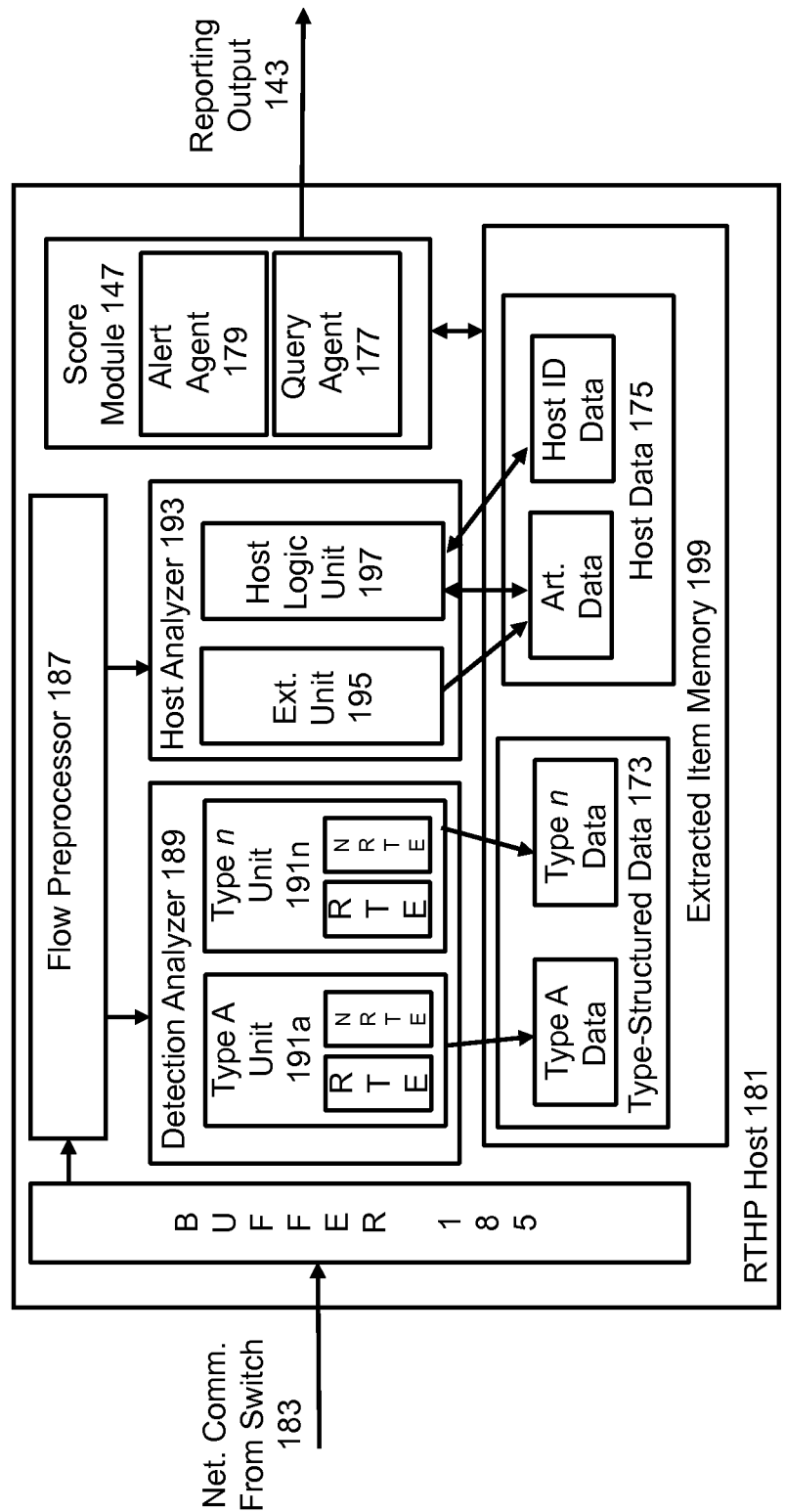

FIG. 1B illustrates an example system in which the approaches disclosed may be implemented. FIG. 1B shows internal aspects of a real-time historical perspective engine (RTHP) 181. At 183, network communications from a switch may be received by RTHP 181 and loaded into a buffer (e.g. rolling buffer) memory structure 185. A flow preprocessor 187 can parse the network traffic using one or more parsing units (not depicted), each of which may be tuned to parse different types of network traffic (e.g. HTTP, TCP). In some embodiments, the flow preprocessor 187 generates session datasets that correspond to communications between two hosts (e.g. between two hosts inside a network or between an external host/entity and an internal host).

The session datasets may be analyzed by a detection analyzer 189, which detects different types of threats or analysis data, and a host analyzer 193, which analyzes the hosts which generated the network traffic. In some embodiments, the detection analyzer 189 and host analyzer 193 may extract one or more data items and store them in an extracted item memory 199.

In particular, the session datasets may be analyzed by a detection analyzer unit 189, which may comprise one or more detection units 191a-191n. In some embodiments, the detection units may contain a real time analysis engine ("RTE") which can identify threats without collecting past data (e.g. accumulating state) and a non-real-time analysis engine ("NRTE"), which generally accumulates data about network events that appear benign, but accumulate to significant threat levels (e.g. DDoS attacks).

In some embodiments, the detection units are customized to analyze the session datasets and extract type-specific data that corresponds to various network threats, attacks, or analysis parameters. For example, detection unit Type A 191A may be designed for detecting relay communication attacks; for every type of relay communication detected, detection unit Type A 191 may store the detection in "Type A" structured data. As a further example, detection unit Type n 191n may be designed to detect bot activity, such that every time a computer or host in the network performs bot-related activities, detection unit Type n may store detection-related data in "Type n" structured data. In some embodiments, the detection data per unit may be stored in a type-structured data 173 portion of memory, which may be partitioned from extracted item memory 199.

In some embodiments, the host analyzer 193 comprises an extraction unit 195 and a host logic unit 197. The extraction unit 195 is designed to extract artifacts or identification data (e.g. MAC address, IP address), which may be used to identify a host, and store the extracted data in an artifact data store ("Art. Data") in host data 175. The host logic unit may analyze the extracted artifact data and generate host ID data (e.g. durable host IDs).

In some embodiments, a score module 147 may be implemented to analyze the extracted item memory 199, score the detections in the type-structured data 173, and correlate the detections with host ID data. In some embodiments, the score module 147 can run checks on the type-structured data to determine if any thresholds have been exceeded. In some embodiments, the score module may edit or update the host ID data (e.g. in host data 175) with new detection information. For instance, the score module may correlate newly detected bit-coin mining activity to an existing host ID and update the host ID with further information regarding the recent bit-coin activity. In some embodiments, the score module 147 further comprises an alert agent 179 which can generate alert data if a network attack threshold is exceeded. In some embodiments, the score module 147 comprises a query agent 177 which can retrieve data from the extracted item memory 199 in response to network security administrators or other network security devices. In some embodiments, the score module may generate the alert data or query responses as reporting output 143.

Further details of an example system are described in U.S. patent application Ser. No. 14/643,931, entitled "A system and method for detecting intrusions through real-time processing of traffic with extensive historical perspective", filed on even date herewith, which is hereby incorporated by reference in its entirety.

Figure 2:
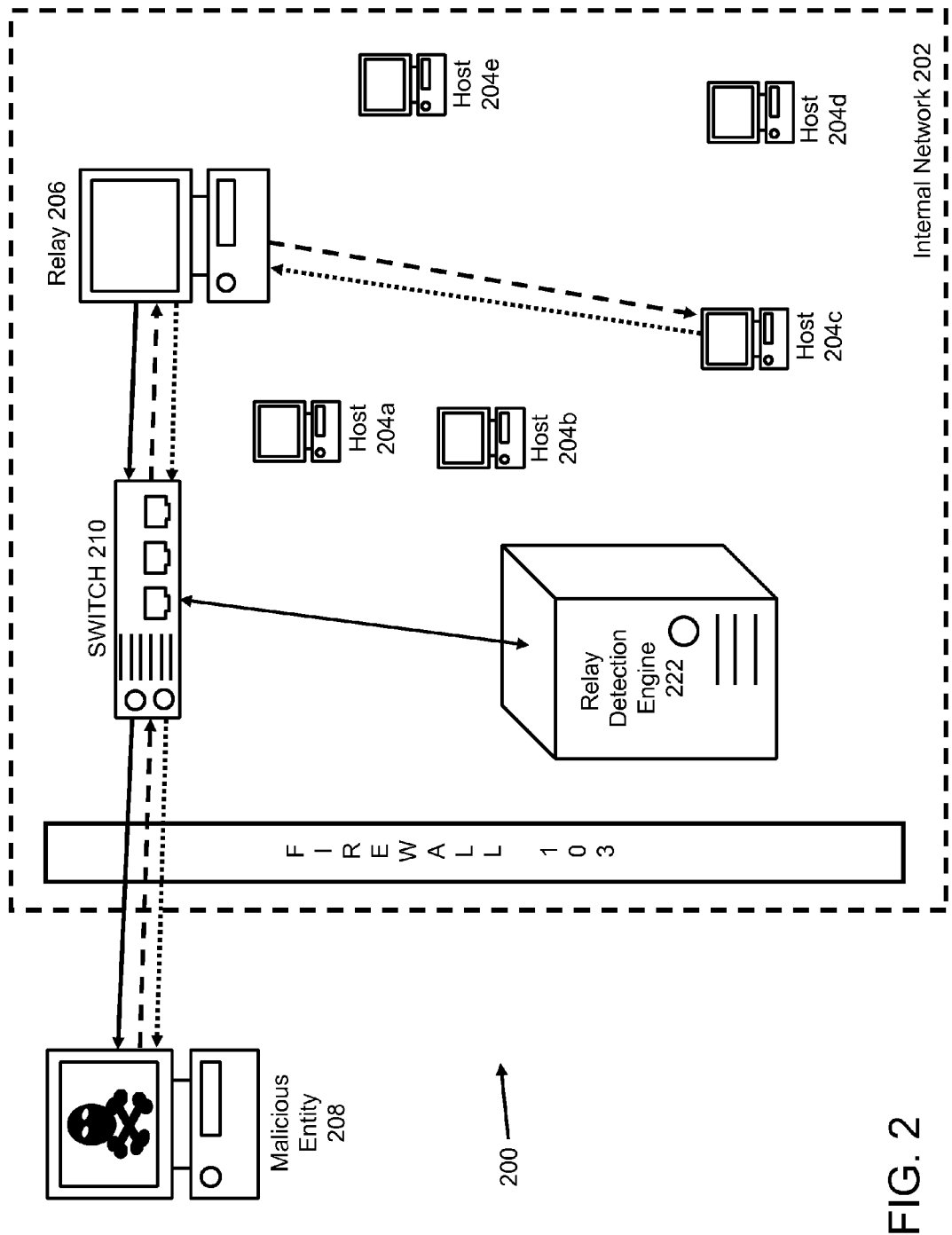
FIG. 2 illustrates a system for detecting malicious relay communications implemented in an example networking environment as according to some embodiments.

FIG. 2 illustrates a relay detection engine for detecting relay attacks in an example networking environment 200, as according to some embodiments. There, an internal network 202 comprises one or more hosts (e.g. computing entities, clients, network computers) 204a, 204b, 204c, 204d, 204e, and 206 that may communicate with one another through networking devices, such as a network switch 210. These are hosts that are generally running software installed with the direct knowledge of the end user of the host or the IT (Information Technology) organization for the company that owns both the network and the host connected to it.

Generally, the internal network 202 is isolated from other networks by network border or security devices, such as a firewall 103. However, if a malicious entity (e.g. external attacking computer) 208 has infected one of the hosts inside the internal network, the malicious entity can use an infected host as a relay 206 to bypass the network firewall 103 and attack other computers inside the network.

For instance, the infected internal host, e.g. relay 206, may send a first communication (denoted by a solid arrow) to the malicious entity 208 to indicate that the relay is ready to act as a bot for the malicious entity 208. The malicious entity 208 may then send a communication destined for other computer in the internal network, using the infected host as a relay. For instance, the malicious entity may send a request (denoted by a dashed arrow) destined for host 204c inside the internal network 202. This communication request is first sent to the relay 206. The relay 206 then acts as a relay and redirects or routes the request to host 204c, the intended destination. Host 204c may then receive the communication, think it is simply a communication from another internal/trusted computer and send a response (denoted by the dotted arrow) back to the malicious entity 208 by way of the relay 206.

Generally, the firewall 103 prevents external hosts from being able to initiate connections into the company network. It does not usually prevent internal hosts from connecting to any external systems using approved protocols such as HTTP (Hypertext Transfer Protocol), DNS (Domain Name System), etc. The firewall attempts to prevent an external attacker from directly infecting a host inside the company network—but if the internal host can be coaxed into contacting an external system, traditional firewalls will not prevent the response from the external system from infecting the internal host. In some networks, such as campus networks, the firewall may also implements NAT (Network Address Translation) functionality that hides the internal IP (Internet Protocol) address of a host when it is communicating with outside systems.

Figure 3:
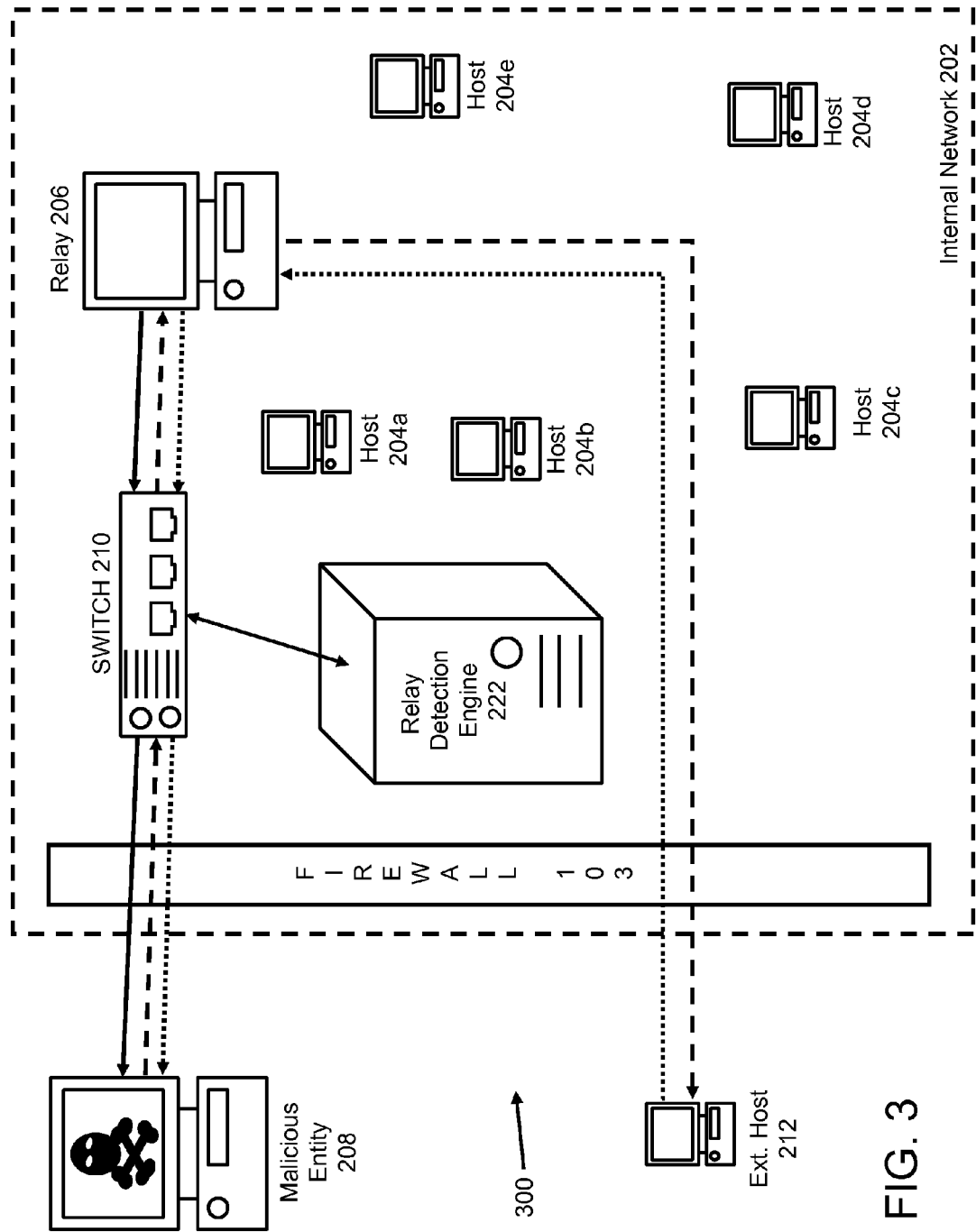
FIG. 3 illustrates a system for detecting malicious relay communications implemented in an example networking environment where an internal host is used as a relay to contact outside hosts, as according to some embodiments.

FIG. 3 illustrates another type of network attack using internal relays to attack external hosts in a networking environment 300, as according to some embodiments. There, the malicious entity 208 plans to use relay 206 for attacks on external hosts. Further, as illustrated, the malicious entity 208 may use the relay 206 to attack external non-infected hosts, such as external host 212. The external hosts or computing entities may belong to other networks, such as network in another company. If the other network trusts internal network 202 then malicious entity 208 can use the internal network's credibility/trust-permissions to attack other networks (e.g. spread malware, trojans, worms; steal data).

Across the two scenarios, the external attacker could perform a variety of tasks, examples of which include DoS (Denial-of-Service) attacks, port scanning, brute force password guessing, data exfiltration, and lateral spread of infection, just to name a few. These types of malicious attacks are difficult to defend against for several reasons. Whereas host 204*c* would highly scrutinize or be suspicious of communications coming from external computers, host 204*c* may readily except or trust communications from computers in the same network (e.g. internal network 202).

As such, malicious entity 208 can use the relay 206 to disguise malicious communications as normal/non-malicious activity occurring between two or more computers in an internal network. If the request (e.g. dotted arrow, FIG. 2) comprised a malicious script, the host 204*c* is more likely to run the script (and become a bot, or send private information back to the sender) because the malicious script was sent from an entity already inside the internal network 202. Once host 204*c* is infected, the mere fact that it uses relay 206 to communicate to malicious entity 208 hides the fact that 204*c* is in communication with malicious entity 208. Thus, there is a need for approaches for detecting network attacks that bypass network security (e.g. firewall 103) by using relays.

Relay detection engine 222 can be implemented to detect malicious relay communication data flows on the network (e.g. relay attacks denoted by dotted and dashed lines in FIG. 2). In some embodiments, as illustrated in FIG. 2, the relay detection engine 222 is coupled directly to the network switch 210 through use of a coupler, such as TAP/SPAN. In this way, the relay detection engine may copy and/or analyze the internal network's traffic without disruption or slowing the network down. The detection system can be located in the company network in such a way that it sees the host traffic to the Internet and sees that traffic before NAT changes the internal IP addresses of each internal host's traffic.

Though the relay detection engine is illustrated as a module external to the switch 210, one of ordinary skill in the art appreciates that the engine may also be directly integrated into the switch 210 as a component. Further, in some embodiments, the relay detection engine 222 may be integrated directly into other network devices, such as a firewall 103 or computers/hosts inside the network (e.g. 204*a*, 204*b*, 204*c*, 204*d*, 204*e*).

Figure 4:
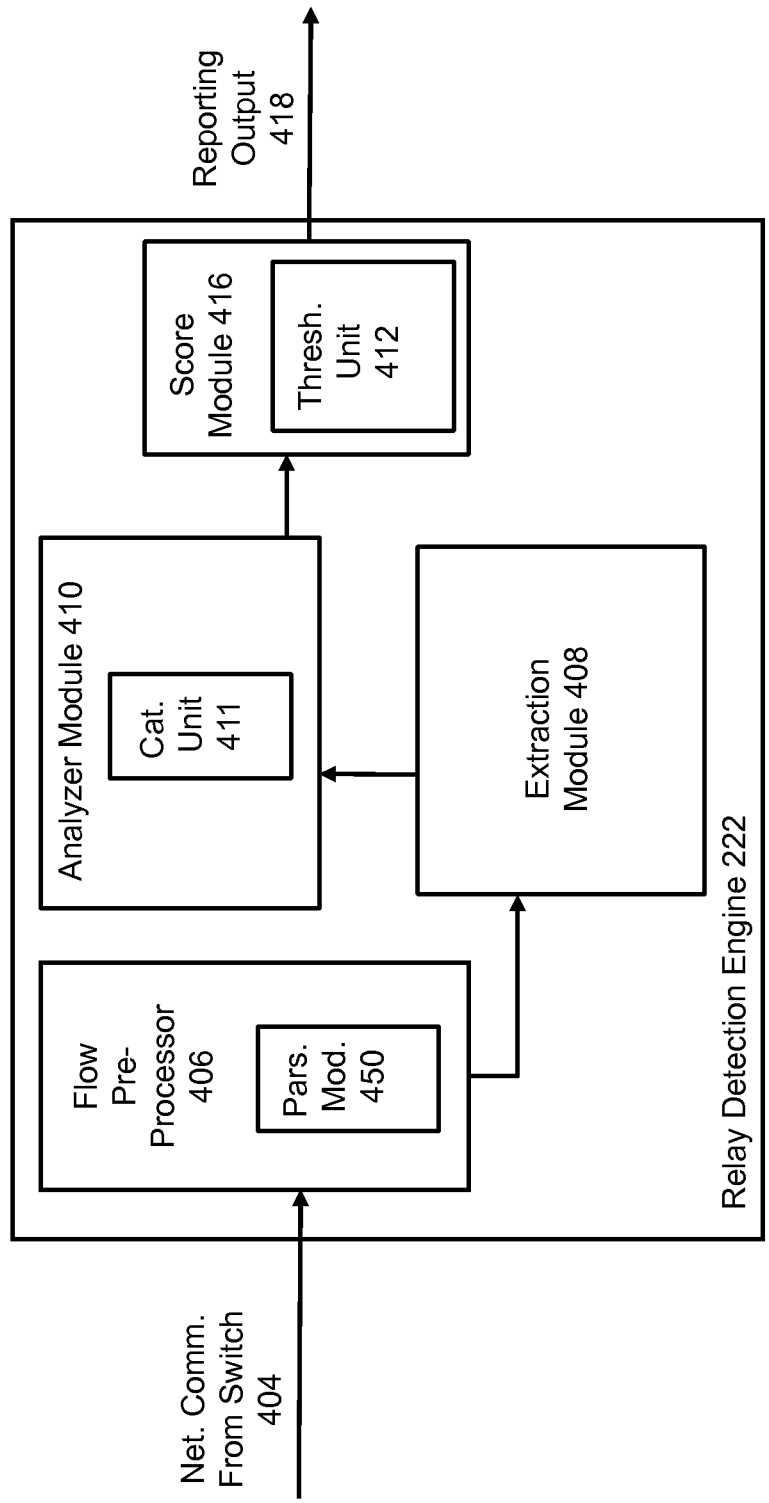
FIG. 4 illustrates internal aspects of the relay detection engine, as according to some embodiments.

FIG. 4 illustrates internal aspects of the relay detection engine, as according to some embodiments. At 404, the relay detection engine 222 may receive traffic for the internal network 202 through the above-disclosed means, such as through a network switch TAP. A flow pre-processor module 406 may use a parsing unit 450 that can analyze the network traffic and divide or break it up into unidirectional flows (e.g. outgoing, incoming) and session datasets. In some embodiments, the parsing module utilizes packet information, such as source and destination addresses to parse the network traffic into the flows.

An extraction module 408 extracts relay metadata that describes the network traffic or flows. In some embodiments, the relay metadata may comprise the amount of bytes in a flow, the first N bytes of a flow (e.g. the first 16 bytes of a flow), the source address, the destination address, variations in flow/packet size, or other statistical data that may be used as metadata to describe the flows without requiring deep content inspection of the packets.

An analysis module 410 (e.g. analyzer module) may employ a categorization unit 411 that uses the relay metadata to categorize the flows into one or more known relay behavior groups. In some embodiments, the categorization unit uses the incoming-flow relay metadata and outgoing flow relay metadata to categorize the flows into one or more relay behavior groups. In some embodiments, the incoming flow relay metadata and the outgoing-flow relay metadata are combined to generate global session data. The global session data may then also be used to categorize the network traffic into one or more relay behavior groups, as further described below.

A score module 416 may use threshold unit 412 that may retrieve past historical data from one or more storage devices and determine whether one or more sessions are likely to be part of a network attack using relays. In some embodiments, the historical data is retrieved and a comparison may be performed between the most recent session categorization (e.g. for a given pair of hosts) and past historical activity. From the comparison, if it is determined that the behavior is equal to or beyond a relay threshold limit, then an alarm (e.g. alarm data, reporting data, output data) may be generated and output at 418. In some embodiments, when a session is categorized as a type recognized relay behavior, a data structure (e.g. reference counter) may be updated that corresponds to the involved hosts. If the reference counter is equal to or surpasses a threshold limit, then an alarm (e.g. alarm data, reporting data) may be generated and output at 418.

Figure 5:
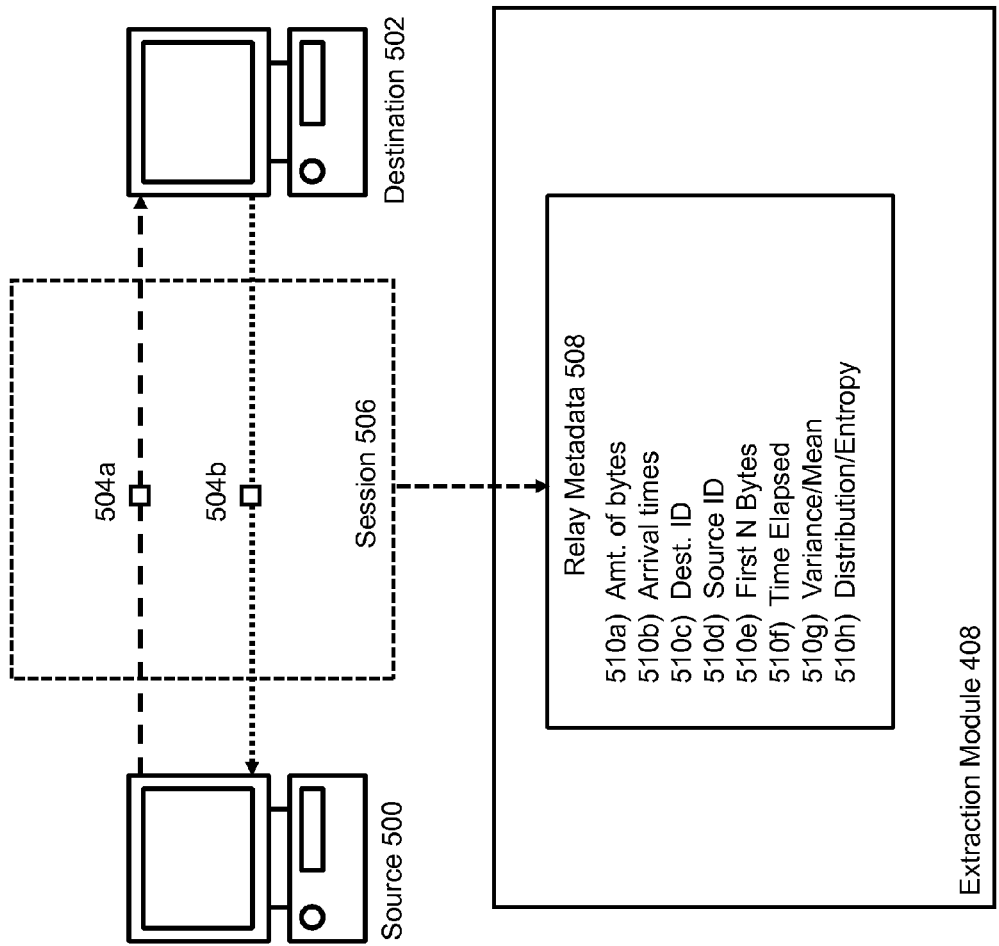
FIG. 5 illustrates aspects of an extraction module operating on a session comprised of communications between a source computer and a destination computer, as according to some embodiments.

FIG. 5 illustrates aspects of a communication session and the extraction module, as according to some embodiments. There, a session is illustrated as comprising communications between two computing entities. In particular, a first computing entity, a source computer 500 (e.g. host, client) sends a first communication 504*a*, which may be in the form of a request in some embodiments. The first communication can be treated as addressed to a second computing entity, the destination 502 (e.g. host, client). When the second communication is received, in some embodiments, a second communication 504b may be sent back to the source computer 500. In some embodiments, 504a and 504b comprise a bi-directional communication using the TCP scheme. In some embodiments, each communication (e.g. 504a, 504b) may be unidirectional, such as communications using a UDP scheme. In some embodiments, a session 506 may comprise communications occurring back and forth between the source 500 and the destination 502 (e.g. bi-directionally). In some embodiments, a session 506 may comprise a single unidirectional communication (e.g. 504a, or 504b) with no communication in response or in the opposite direction. This may occur, for instance, if a request was sent as a first communication, but no response occurred.

The extraction module 408 can extract one or more relay metadata items 508, which may be used to characterize the unidirectional communications and/or the session 506. In some embodiments, the relay metadata 508 may comprise a data item corresponding to the amount of bytes 510a in the session 506, or in a communication (e.g. 504a, 504b). In some embodiments, the relay metadata 508 may comprise a data item corresponding to the arrival time of the communications 510b (e.g. the time destination computer 502 receives communication 504a).

In some embodiments, the relay metadata 508 may comprise a data item corresponding to the identifiers (510c and 510d) for sending or receiving computers. Examples of the identifiers include the IP address, or MAC addresses of the computers. In some embodiments, the relay metadata 508 may comprise a data item corresponding to the arrival time of the communications 510b (e.g. the time destination computer 502 receives communication 504a).

In some embodiments, the relay metadata 508 may comprise a data item corresponding to the first N number of bytes of a communication 510e (e.g. 504a, 504b). Often network communications have common header information. As such, the first N bytes of a communication (e.g. first 16 bytes of 504a) may be used to characterize or track the communications and/or sending computers.

In some embodiments, the relay metadata 508 may comprise a data item corresponding to the time elapsed between communications 510f. For instance, the time elapsed metadata item may correspond to the time elapsed since first communication 504a is sent, and second communication 504b is received.

In some embodiments, the relay metadata 508 may comprise a data item corresponding to the variance or mean of the packet sizes 510g (e.g. mean size of packets in 504a, 504b, 506). In some embodiments, the relay metadata 508 may comprise a data item corresponding to the distribution and/or entropy of inter-packet arrival times, packet sizes, or bytes values themselves 510h (e.g. in regards to packets in 504a, 504b, 506).

Figure 6:
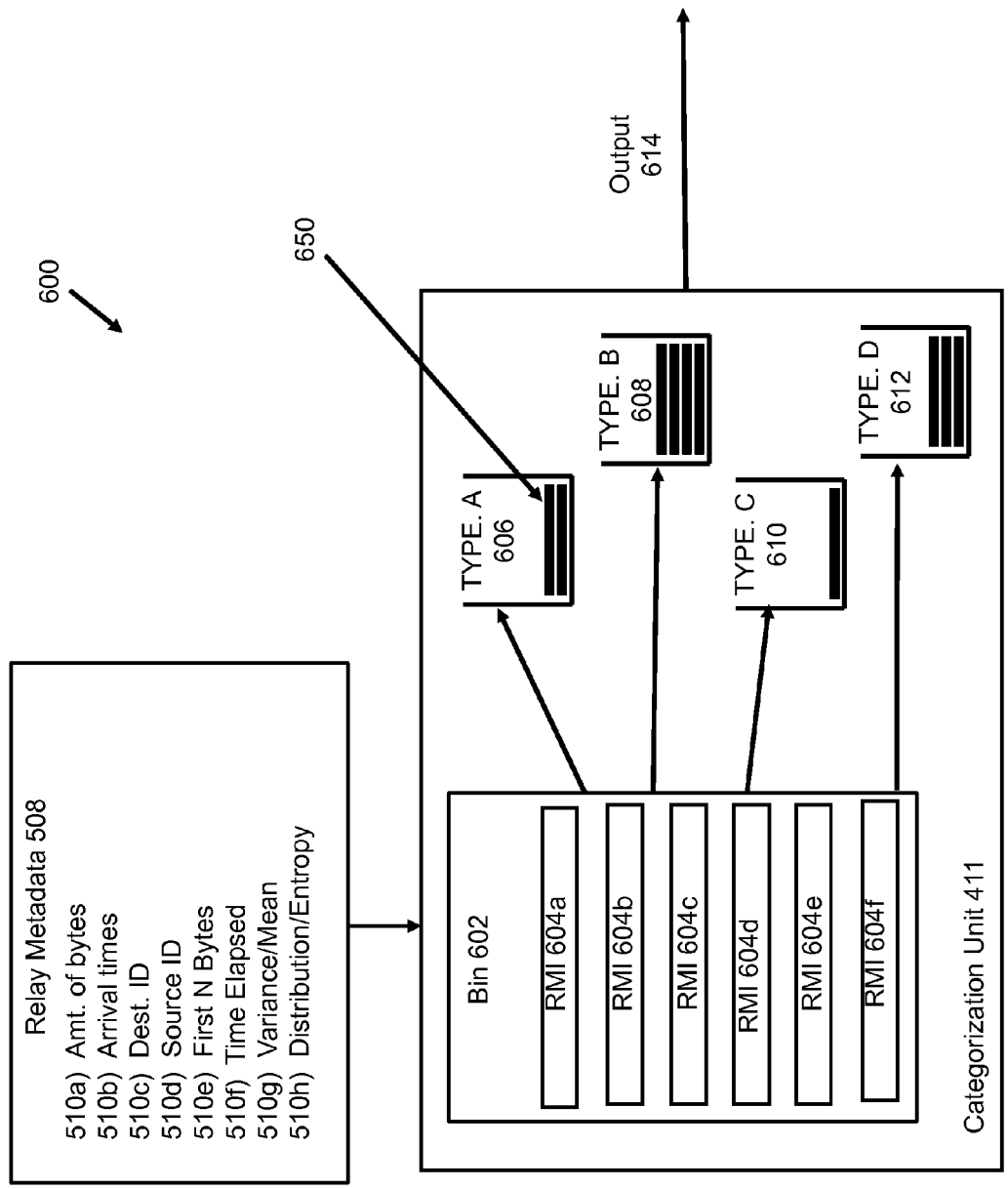
FIG. 6 illustrates aspects of a categorization unit and relay metadata, as according to some embodiments.

FIG. 6 illustrates aspects of relay categorization 600, as according to some embodiments. There, relay metadata 508 may be received by the categorization unit 411. In some embodiments, relay metadata instances (RMI) 604a-604f may correspond to session data (e.g. 506) for different sessions and may be used to analyze labels and constraints, as explained below. In some embodiments, a bin 602 may be used as a queue to store the relay metadata instances. In some embodiments, the categorization unit 411 may categorize the relay metadata instances (e.g. 604a-604f) according to whether they match known relay communication patterns (e.g. further described in relation FIG. 7A-D and FIG. 9 below). In some embodiments, only exact matches between metadata instances may denote a relay communication in a session. For instance, if relay metadata instance 604a and 604b are exact matches (e.g. relay metadata items 510a-h match flow and label constraints) for relay type C (see FIG. 7C below), then a single detection or data item 650 may be placed in the Type C data structure, which may trigger an output 614 that relay communications are occurring.

In some embodiments, exact matching may be not implemented for various reasons. For example, if the amount of bytes (e.g. 510a) in a session is not useful due to encryption (e.g. causing the amount to always be the same or causing the amount of bytes to widely vary) exact matching may not be practical. In those embodiments, the metadata instances may be aggregated in a data structure (e.g. see Type B 608 with multiple data items 650). When the number of hits or the degree of similarity in matches rises above a threshold, it may be determined that enough evidence that a particular type of relay exists (Type B, for example) and the relay or data describing the relay may be output at 614.

FIGS. 7A-D illustrate relay attack behavior that may be detected by relay detection engine 222. In some embodiments, relay communications may be detected by identifying a direction of session establishment. For instance, if an attacking entity (e.g. 208) establishes a first session with a relay (e.g. host 206) and the relay establishes a second session with a victim computer (e.g. 204c) the order or direction of the session establishment (e.g. a first session between 208 and 206 which is followed by a second session between 206 and 204c) may be used to identify relay behavior. However, in contrast to conventional approaches, the relay detection engine 222, in some embodiments, may implement metadata and/or constraints that allow relay activity to be detected independent of the direction of session establishment. That is, the direction of session establishment or categorization of session datasets need not have any relation to the direction of data flow in the relay communications.

Figure 7A:
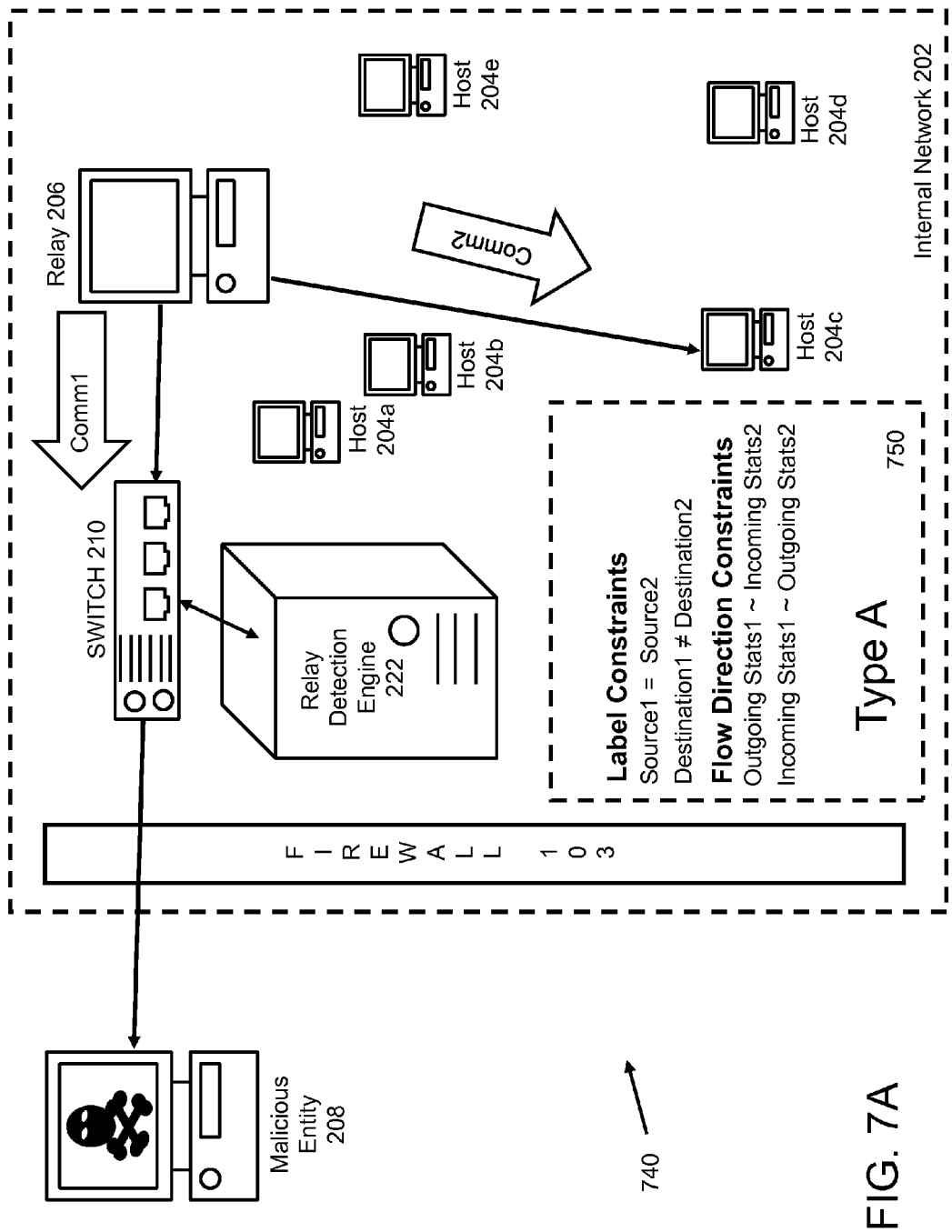
FIG. 7A-D illustrate types of relay communication behaviors and categorization constraints, such as label constraints and flow direction constraints, that may be used to categorize the network communications, as according to some embodiments.

FIG. 7A illustrates an environment 740 where out-based relay attack behavior is occurring, as according to some embodiments. As used in this example, the term "out" is arbitrary: in FIG. 7A it denotes the fact that relay host 206 initiates both connections; further, this type of attack may be referred to as a Type A relay behavior. As illustrated, relay host 206 (e.g. relay computer) initiates a Communication 1 ("Comm1") to malicious entity 208 (e.g. control computer). The relay host then initiates Communication 2 ("Comm2") to host 204c (e.g. destination computer). The extraction module 408 can analyze Comm1 (e.g. session dataset) and Comm2 (e.g. session dataset) and extract relay metadata from them. Using the extracted metadata, the relay categorization unit 411 can categorize the behavior using the Type A label and flow direction constraints shown in relay data structure 750.

The Type A label constraints correspond to the directions of the communications. For instance, to be considered Type A relay behavior the source of the two communications, Comm1 and Comm2, is the same: Comm1 and Comm2 originate from relay host 206. As such, "Source1 =Source2" (see 750). Further, the destinations of the two communications are also different: Comm1 is directed to malicious entity 208 and Comm2 is directed to Host 204c. As such, "Destination1≠Destination2" (see 750).

The Type A flow direction constraints can also be used to verify communications between two computing entities. For instance, in a Type A communication relay behavior the Outgoing Statistics of Comm1 (e.g. the relay metadata describing Comm1) may be proportional to the Incoming Statistics of Comm2. In other words, in some embodiments, this confirms that what was sent from Host 204c to Relay 206 is the same as what was sent from Relay 206 to malicious entity 208. Similarly, the Incoming Statistics of Comm1 may be proportional to the Outgoing Statistics of Comm2. In other words, in some embodiments, this confirms that what was received by relay 206 was the same as what was sent to host 204c.

Collectively, the categorization unit can use the relay metadata, the label constraints, and/or the flow direction constraints to analyze and categorize the communications occurring in FIG. 7A as "Type A".

Figure 7B:
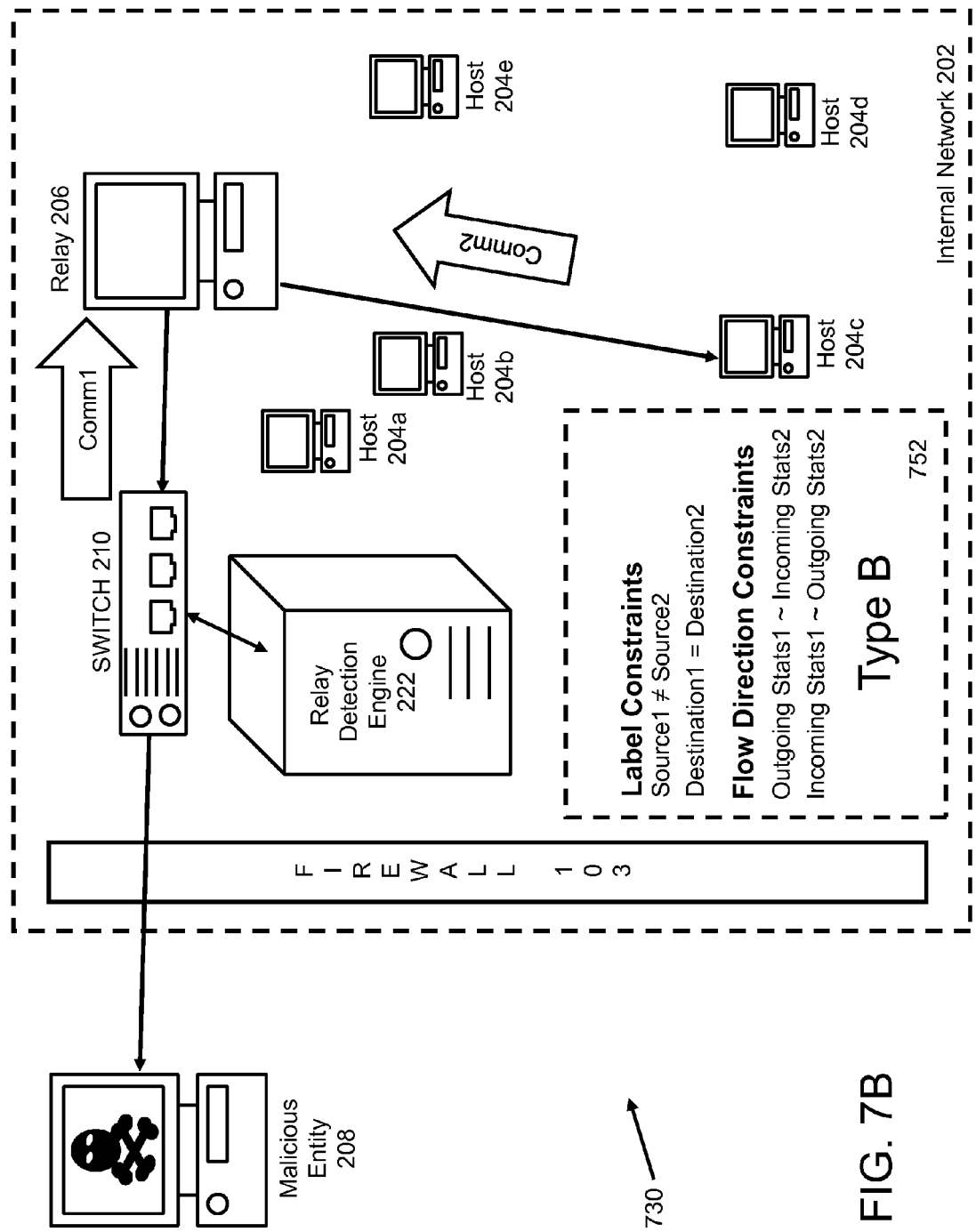

FIG. 7B illustrates an environment 730 where in-based relay attack behavior is occurring, as according to some embodiments. As used in this example, the term "in" is arbitrary: in FIG. 7B it denotes the fact that relay host 206 receives both connections; further, this type of attack may be referred to as a Type B relay behavior. As illustrated, host malicious entity 208 (e.g. control computer) initiates a Communication 1 ("Comm1") to relay 206 (e.g. relay computer) and Host 204c (e.g. destination computer) initiates Communication 2 ("Comm2") to relay 206. The extraction module 408 can analyze these Comm1 and Comm2 and extract relay metadata from them. Using the extracted relay categorization unit 411 can categorize the behavior using Type B label and flow direction constraints shown in relay data structure 752.

The Type B label constraints correspond to the directions of the communications. For instance, to be considered Type B relay behavior the source of the two communications, Comm1 and Comm2, is not the same: Comm1 originates from malicious entity 208, and Comm2 originates from Host 204c. As such, "Source1≠Source2" (see 752). Further, the destinations of the two communications are the same: Comm1 and Comm2 are both directed to Relay 206. As such, "Destination1=Destination2" (see 752).

The Type B flow direction constraints can also be used to verify communications between two computing entities. For instance, in a Type B communication relay behavior the Outgoing Statistics of Comm1 (e.g. the relay metadata describing Comm1) may be proportional to the Incoming Statistics of Comm2 (e.g. the relay metadata describing Comm2). In other words, in some embodiments, this confirms that what was sent from host 204c to Relay 206 is the same as what was sent from Relay 206 to malicious entity 208. Similarly, the Incoming Statistics of Comm1 may be proportional to the Outgoing Statistics of Comm2. In other words, in some embodiments, this confirms that what was received by malicious entity 208 was the same as what was sent by Host 204c.

Collectively, the categorization unit can use the relay metadata, the label constraints, and/or the flow direction constraints to analyzed and categorize the communications occurring in FIG. 7B as "Type B".

Figure 7C:
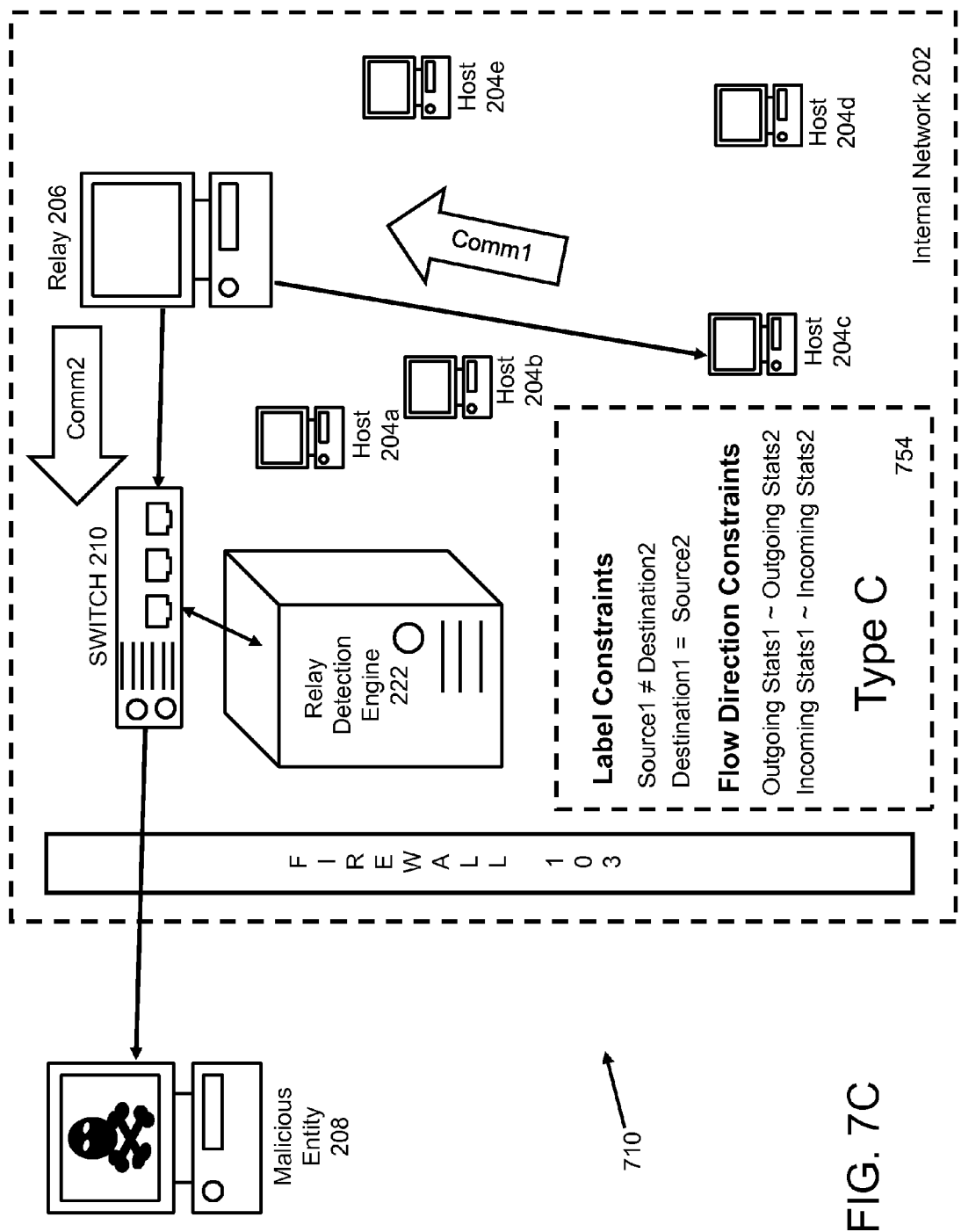

FIG. 7C illustrates an environment 710 where counter-clockwise relay attack behavior is occurring, as according to some embodiments. As used in this example, the term "counter-clockwise" describes the sequence in which communication is established: in FIG. 7C it denotes Comm1 being established from Host 204c to Relay 206 and Comm2 being established from Relay 206 to malicious entity 208; further, this type of attack may be referred to as a Type C relay behavior. As illustrated, Host 204c (e.g. destination computer) initiates Communication 1 ("Comm1") to relay 206 (e.g. relay computer). Also, relay 206 initiates Communication 2 ("Comm2") to malicious entity 208 (e.g. control computer). The extraction module 408 can analyze these Comm1 and Comm2 and extract relay metadata from them. Using the extracted relay categorization unit 411 can categorize the behavior using Type C label and flow direction constraints shown in relay data structure 754.

The Type C label constraints correspond to the directions of the communications. For instance, to be considered Type C relay behavior the destination Comm1 must equal the source of Comm2:Comm1 terminates at relay 206 and Comm2 originates from relay 206. As such, "Destination1=Source2" (see 754). Further, the destinations of the two communications are different: Comm1 is directed to malicious entity 208 and Comm2 is directed to host 204c. As such, "Destination1≠Destination2" (see 754).

The Type C flow direction constraints can also be used to verify communications between two computing entities. For instance, in a Type C communication relay behavior the Outgoing Statistics of Comm1 (e.g. the relay metadata describing Comm1) may be proportional to the Outgoing Statistics of Comm2 (e.g. the relay metadata describing Comm2). In other words, in some embodiments, this confirms that what was sent from Host 204c to Relay 206 is the same as what was sent from Relay 206 to malicious entity 208.

Similarly, the Incoming Statistics of Comm1 may be proportional to the Incoming Statistics of Comm2. In other words, in some embodiments, this confirms that what was received by Host 204c is the same as what malicious entity 208 sent to relay 206.

Collectively, the categorization unit can use the relay metadata, the label constraints, and/or the flow direction constraints to analyzed and categorize the communications occurring in FIG. 7C as "Type C".

Figure 7D:
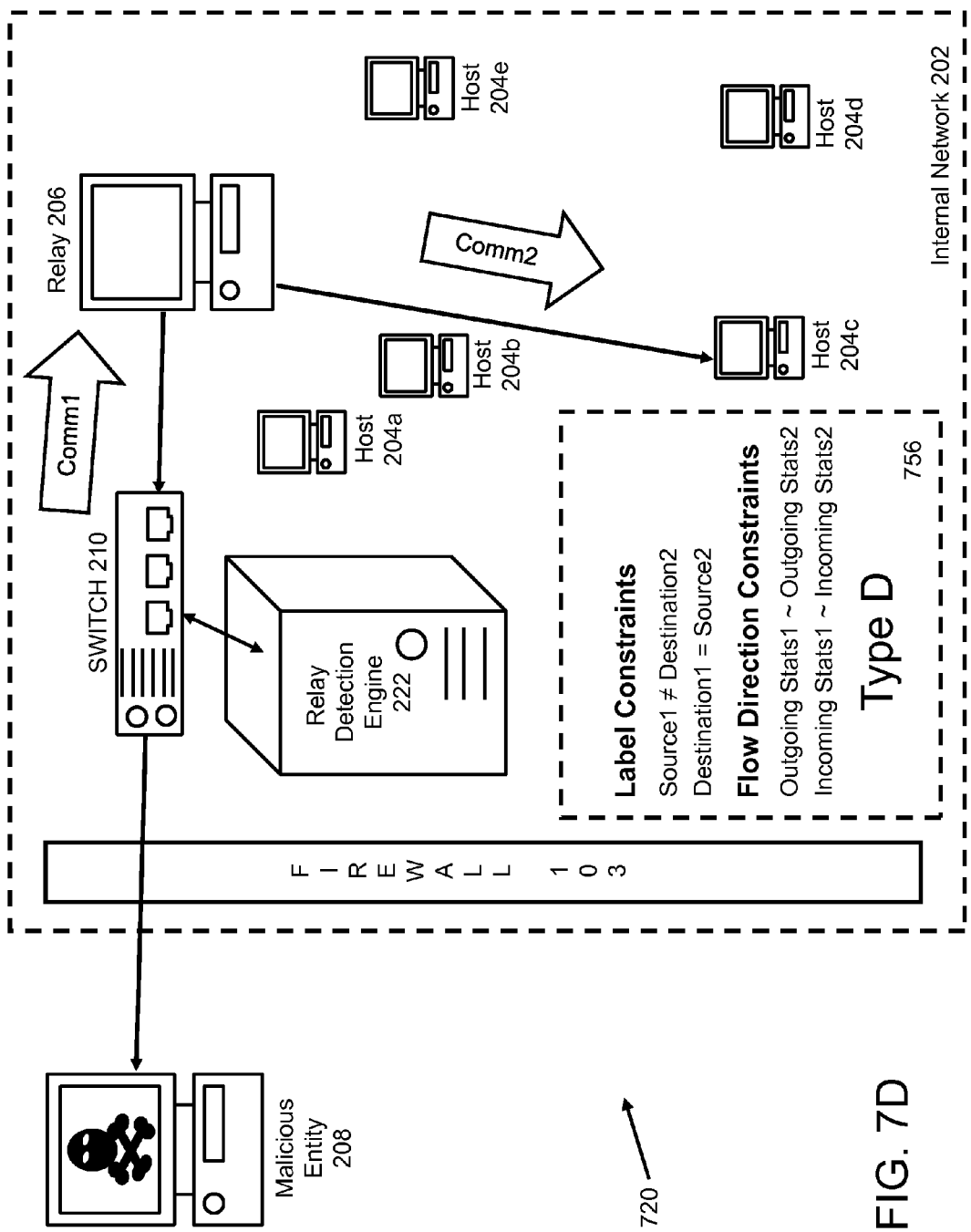

FIG. 7D illustrate an environment 720 where clockwise relay attack behavior is occurring, as according to some embodiments. As used in this example, the term "clockwise" describes the sequence in which communication is established: in FIG. 7D it denotes clockwise directions of the initiation of Comm1 and Comm2; further, this type of attack may be referred to as a Type D relay behavior. As illustrated, malicious entity 208 (e.g. control computer) initiates Communication 1 ("Comm1") to relay 206 (e.g. relay computer). Also, relay 206 initiates Communication 2 ("Comm2") to host 204c (e.g. destination computer). The extraction module 408 can analyze these Comm1 and Comm2 and extract relay metadata from them. Using the extracted relay categorization unit 411 can categorize the behavior using Type D label and flow direction constraints shown in relay data structure 756.

The Type D label constraints correspond to the directions of the communications. For instance, to be considered Type D relay behavior the source of the first communication Comm1 and the destination of the second communication Comm2, is not the same: Comm1 originates from malicious entity 208 and Comm2 terminates at host 204c. As such, "Source1≠Destination2" (see 756). Further, the destination of the first communication is the same as the source of the second communication: Comm1 terminates at relay 206 and Comm2 is initiated by relay 206. As such, "Destination1=Source2" (see 756).

The Type D flow direction constraints can also be used to verify communications between two computing entities. For instance, in a Type D communication relay behavior the Outgoing Statistics of Comm1 (e.g. the relay metadata describing Comm1 ) may be proportional to the Outgoing Statistics of Comm2 (e.g. the relay metadata describing Comm2). In other words, in some embodiments, this confirms that what was sent from malicious entity 208 to Relay 206 is the same as what was sent by relay 206 to host 204c.

Similarly, the Incoming Statistics of Comm1 may be proportional to the Incoming Statistics of Comm2. In other words, in some embodiments, this confirms that what was received by malicious entity 208 from relay 206 is the same as what was received by relay 206 from host 204c.

Collectively, the categorization unit can use the relay metadata, the label constraints, and/or the flow direction constraints to analyzed and categorize the communications occurring in FIG. 7D as "Type D".

Figure 8:
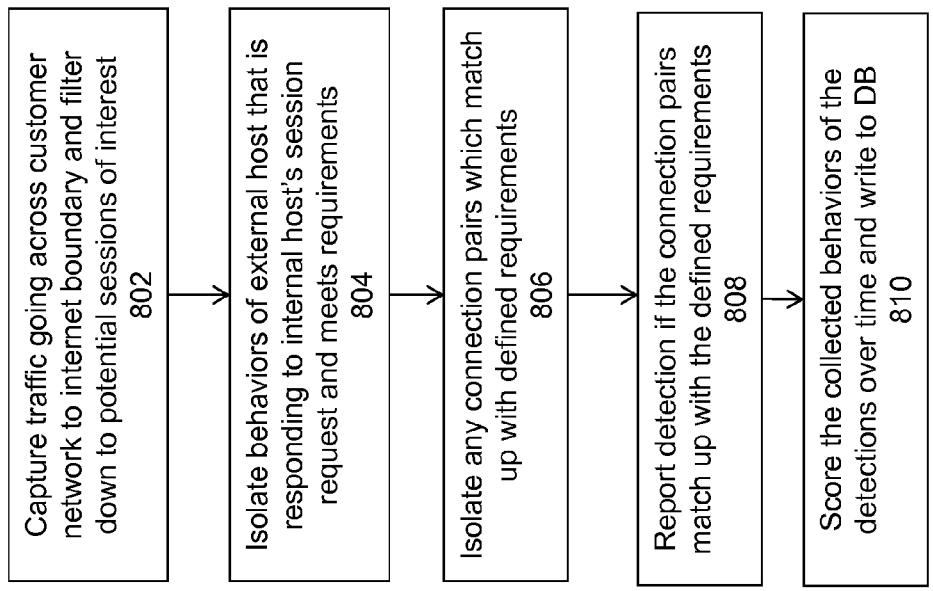
FIG. 8 shows a flowchart for an approach for detecting malicious relay communications, as according to some embodiments.

FIG. 8 shows a flowchart for an approach for detecting network attacks using relays, as according to some embodiments. At 802, the system may begin by filtering down the network traffic it sees to sessions that may be part of relay behavior. This approach to relay detection does not rely on traditional means like signature creation (e.g. which can be easily defeated with simple changes to the protocol or basic encryption techniques) to match a pattern in the data payloads, as in some cases signatures may be defeated with simple changes to the protocol or basic encryption techniques.

Instead, by comparing sessions (e.g. a semi-permanent information interchange between two network addresses) which emanate from the suspected relay (e.g. relay 206) the detection system can check if various statistics describing an inbound session nearly match the statistics of an outbound session for the same host at 804, as according to some embodiments. The statistics utilized by the detection system can include, as an example, bytes sent to and from a potential internal relay host, time of session initiation, some of the contents of network packets, the packet size and packet arrival time statistics 806.

Some collection of these statistics will remain the same or very similar between relayed sessions even if the data is encrypted at the attacker's direction. Because this method does not directly verify that the incoming data matches the outgoing data, the detection system may detect the relay based at least in part on an accumulation of evidence across on pair of sessions or across several sessions. At 808, if enough evidence of relay behavior is gathered either within or across sessions, a detection of relay behavior is reported.

Once the system has detected relay behavior by an internal host, it may proceed to score the behavior it sees based on the certainty of the detection and the threat that the behavior represents to the company's network and writes the results into a reporting database 810. The IT department may then review the data and may then take appropriate action to address the intrusion. For example, the company IT staff may choose to fix the relay (e.g. by reinstalling the operating system on it or removing the unwanted software), thereby turning it back into an uninfected host.

Figure 9:
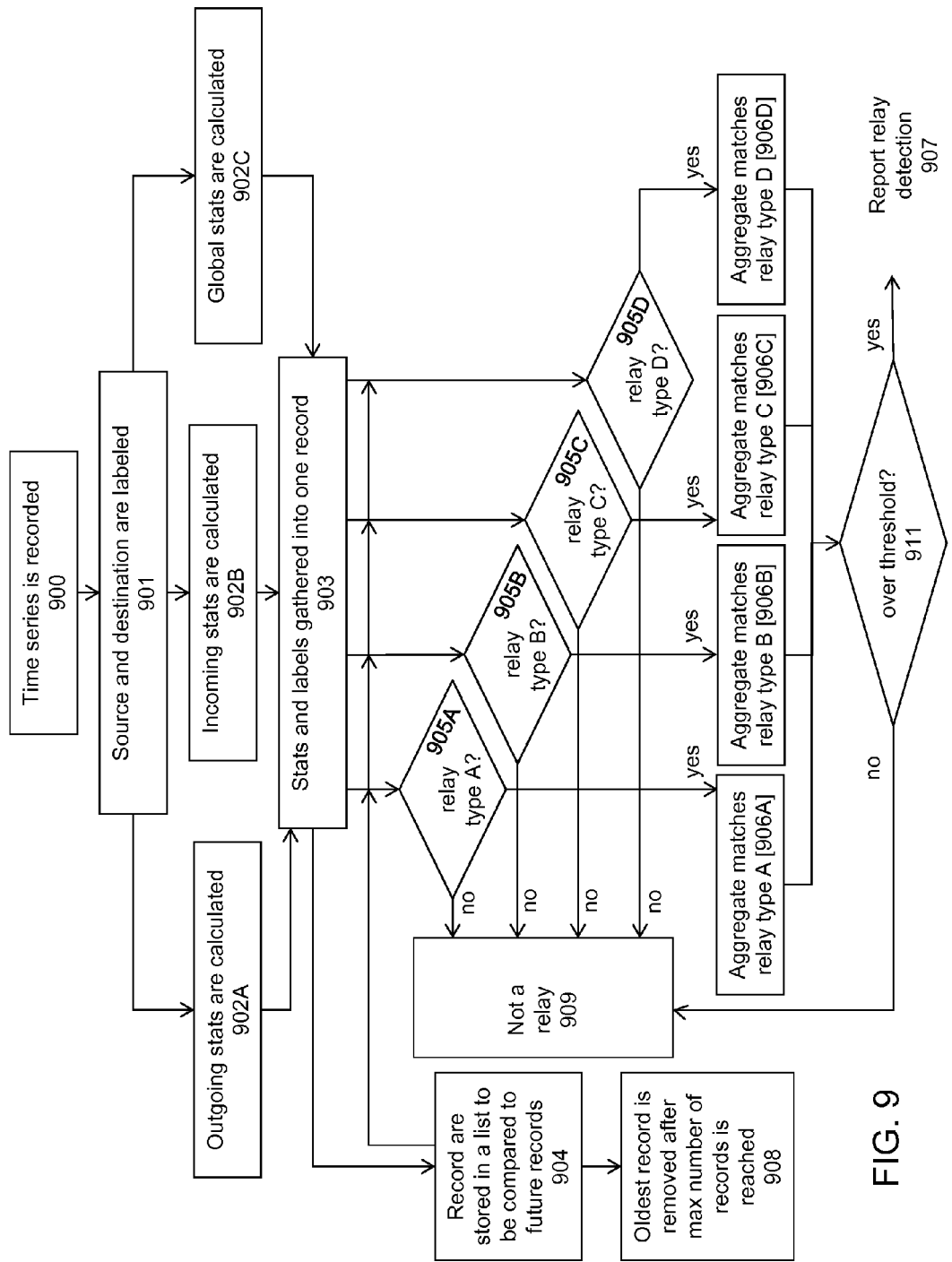
FIG. 9 shows a flowchart for different aspects of an approach for detecting malicious relay communications, as according to some embodiments.

FIG. 9 shows a flowchart of an approach for how a relay detection system may detect the four types of relays, as according to some embodiments. At 900, a time series of packets corresponding to a communication session may be recorded. At 901, labels corresponding to the parties on either end of the communication may then be generated. The labels may include IP addresses wherein, for example, the label corresponding to the party that initiates the conversation is referred to as the "source", and the other label is referred to as the "destination". Next, a variety of statistical techniques may be applied to the data.

As explained above, these statistics may include the first N bytes in either direction, the means and variances of the packet sizes, and the distribution and entropy of inter-packet arrival times, packet sizes, or bytes values themselves 902A-C. Statistics may then be calculated on the time series of packets in the session that flow from the source to the destination. These statistics are referred to as the outgoing statistics 902A, as according to some embodiments. Statistics are calculated on the time series of packets in the session that flow from the destination to the source. These statistics are referred to as incoming statistics 902B. Statistics may be calculated on the time series of packets from both the incoming and outgoing packets of the session combined. These statistics may be referred to as global statistics 902C. All the statistics from 902A-C and labels from 901 may be collected into one record representing the session 903. The records are stored temporarily in the session data store 904, so that they may later be compared with other records representing the other potential session in the relay. In some embodiments, it is possible that only records fitting certain criterion will be stored in order to save space. For example, the detection system may save only records with a minimum number of bytes. The oldest records stored in the session data store are removed when the store exceeds a maximum number of records 908. In some embodiments, the detection system may remove sessions or records that are older than an expiration time limit. In this way, the records in the relay bucket data structures may comprise the last number of records that occurred (if using a item limit) or comprise the last occurring or detected records (if implementing a expiration limit) or combinations thereof.

Next, the session records in the session data store are compared to each other in an effort to find possible relays 905A-D. For each of the four example relay types (see FIG. 7A-D), two sessions are considered to match if they meet the label constraints for the type and the required statistics are similar enough according to some similarity metric. The specific metrics used may depend on the exact statistics used to describe the sessions, and/or the exact tolerance for false positives in the detection process. For scalar statistics (e.g. mean, variance, and entropy of packet sizes or inter-packet arrival times) the absolute difference in statistics or the percentage difference in statistics may be used or implemented. For statistics representing distributions such as histograms or parametric distribution models (e.g. mixture of Gaussians), more appropriate information-based divergences (e.g. the Kullback-Liebler Divergence, the Jensen-Shannon Divergence, or the Hellinger Distance) may be implemented to measure similarity. In some embodiments, for specific byte statistics, such as the first N bytes in either direction, an exact match requirement may be implemented. In some embodiments, for specific byte statistics, a distance metric, such as the Hamming Distance, can be used.

The number of statistics used and the degree to which the statistics must be similar to each others may determine how exact two sessions' characteristics need to be in order for the pair of sessions to be considered a relay (e.g. categorized into the relay behaviors illustrated in FIG. 7A-D). For example, when detecting an encrypted relay, exact byte statistics may not be helpful—alternately, when detecting a relay that changes protocol in the relay (e.g. application protocol in one session is different than it is in the other) tight bounds on byte sizes and inter-packet times may not be helpful.

The matches (e.g. 905A-D) for the session may then be aggregated. This aggregation may be a simple count of the number of matches or include the degree to which the statistics match one another 906A-D. When the number of hits or the degree of similarity in matches rises above a threshold 911, it may be determined that enough evidence that a particular type of relay exists and the relay or data describing the relay may be reported at 907. In some cases, there may not be a match or the threshold may not be reached for any type of relay, in which case nothing may be reported, at 909.

Figure 10:
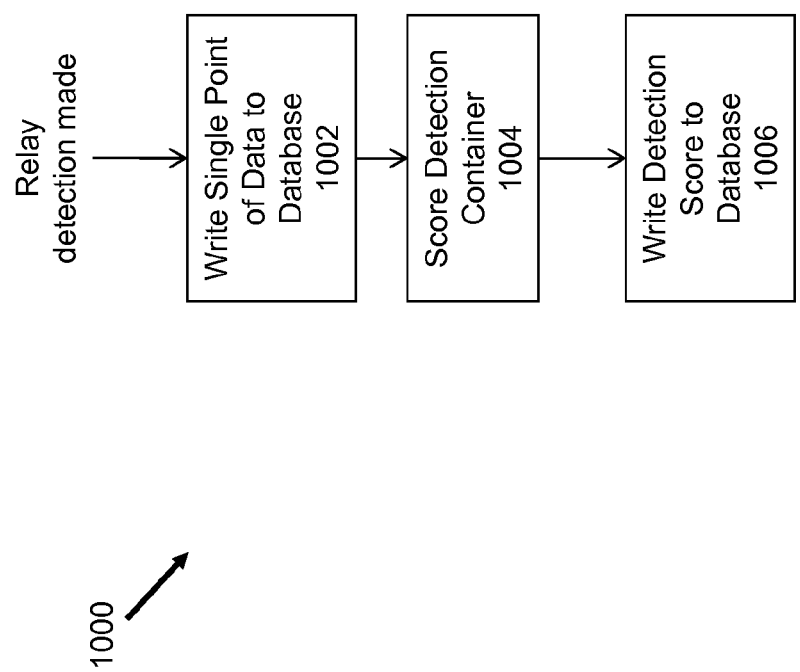
FIG. 10 shows a flowchart for scoring and reporting aspects of an approach for detecting malicious relay communications, as according to some embodiments.

FIG. 10 shows a flowchart 1000 for an approach for scoring and reporting relay behaviors detected, as according to some embodiments. The score module 416 of the system may control the information or data about detections, and may control what data is written to the database. At 1002, information about the current relay detection may be written to a database. Next, at 1004, information about all the relay detections that have recently been reported against the same internal host are retrieved from the database and a certainty and threat score may be computed for each internal host. The persistence (e.g. in terms of sessions and across time) of the host's relay behavior may guide the detection system certainty that the internal host is a relay. The quantity of data involved in the relay and the type of relay (one involving another internal host as opposed to one involving another external host) may guide the detection system's report on how threatening the behavior is. Further, in some embodiments, at 1006, the certainty and threat scores are also written to the database for ultimate display to the company's IT security staff.

Figure 11:
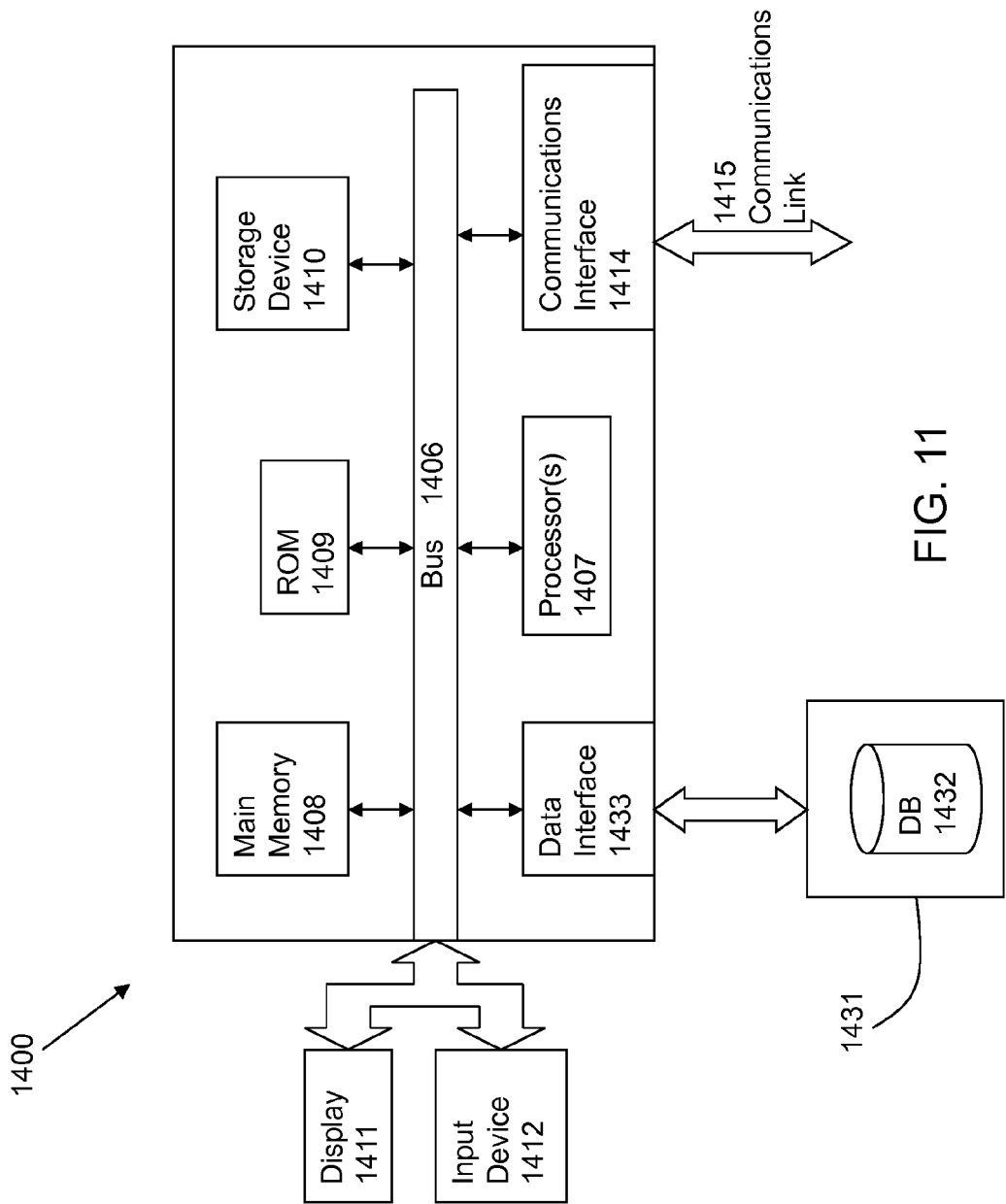
FIG. 11 illustrates example system architecture.

FIG. 11 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system for detecting malicious relay communication data flows between a plurality of computers, comprising:
   a computer processor to execute a set of program code instructions;
   a memory to hold the program code instructions, in which the program code instructions comprises program code to:
   receive network traffic generated by a plurality of hosts and labels the network traffic into one or more session datasets;
   extract relay metadata from the one or more session datasets;
   use the relay metadata to both:
   (a) categorize the one or more session datasets as data items in one or more relay data structures corresponding to one or more known relay communication patterns using the relay metadata and
   (b) correlate the data items into the one or more known relay communication patterns by matching the data items to both a flow direction and a statistical description of known relay communication patterns, the known relay communication patterns corresponding to types of relay behavior communication patterns registered in a database as correlating to communications from a control computer to other hosts through a relay computer; and
   generate reporting output data if a number of data items in the one or more relay data structures is equal to or exceeds a limit.

2. The system of claim 1, wherein session dataset categorization is independent of a direction of the malicious relay communication data flows.

3. The system of claim 1, wherein the program code further uses label constraints and flow direction constraints to categorize the one or more session datasets into the one or more relay data structures.

4. The system of claim 3, wherein at least one of the one or more relay data structures corresponds to the label constraints and the flow direction constraints that describe a first session initiated by the control computer and directed to the relay computer and a second session initiated by the relay computer and directed to a destination computer.

5. The system of claim 3, wherein at least one of the one or more relay data structures corresponds to the label constraints and the flow direction constraints that describe a first session initiated by a destination computer and directed to the relay computer and a second session initiated by the relay computer and directed to the control computer.

6. The system of claim 3, wherein at least one of the one or more relay data structures corresponds to the label constraints and the flow direction constraints that describe a first session initiated by the control computer and directed to the relay computer and a second session initiated by a destination computer and directed to the relay computer.

7. The system of claim 3, wherein at least one of the one or more relay data structures corresponds to the label constraints and the flow direction constraints that describe a first session initiated by the relay computer and directed to the control computer and a second session initiated by the relay computer and directed to a destination computer.

8. The system of claim 1, wherein the relay metadata comprises at least one or more of the following: data corresponding to an amount of bytes in a session, data corresponding to arrival times of packets in a session, data corresponding to identifiers of one or more source or destination computers, data corresponding to a first segment of a flow, data corresponding to a time elapsed between two flows in a session, data corresponding to a mean size of packets in a session, or data corresponding a distribution of characteristics of packets in a session.

9. The system of claim 1, wherein data items in the one or more relay data structures that are older than an expiration time are removed from the one or more relay data structures.

10. A computer-implemented method for detecting malicious relay communication data flows between a plurality of computers, comprising:
    labeling network traffic that is generated by a plurality of hosts into one or more session datasets;
    extracting relay metadata from the one or more session datasets;
    categorizing the one or more session datasets as data items in one or more relay data structures corresponding to one or more known relay communication patterns using the relay metadata;
    correlating the data items into the one or more known relay communication patterns by matching the data items to both a flow direction and a statistical description of known relay communication patterns, the known relay communication patterns corresponding to types of relay behavior communication patterns registered in a database as correlating to communications from a control computer to other hosts through a relay computer; and
    generating reporting output data if a number of data items in the one or more relay data structures exceeds a limit.

11. The computer-implemented method of claim 10, wherein session dataset categorization is independent of a direction of the malicious relay communication data flows.

12. The computer-implemented method of claim 10, wherein categorizing the one or more session datasets as data items in one or more relay data structures uses label constraints and flow direction constraints.

13. The computer-implemented method of claim 12, wherein at least one of the one or more relay data structures corresponds to the label constraints and the flow direction constraints that describe a first session initiated by the control computer and directed to the relay computer and a second session initiated by the relay computer and directed to a destination computer.

14. The computer-implemented method of claim 12, wherein at least one of the one or more relay data structures corresponds to the label constraints and the flow direction constraints that describe a first session initiated by a destination computer and directed to the relay computer and a second session initiated by the relay computer and directed to the control computer.

15. The computer-implemented method of claim 12, wherein at least one of the one or more relay data structures corresponds to the label constraints and the flow direction constraints that describe a first session initiated by the control computer and directed to the relay computer and a second session initiated by a destination computer and directed to the relay computer.

16. The computer-implemented method of claim 12, wherein at least one of the one or more relay data structures corresponds to the label constraints and the flow direction constraints that describe a first session initiated by the relay computer and directed to the control computer and a second session initiated by the relay computer and directed to a destination computer.

17. The computer-implemented method of claim 12, wherein the relay metadata comprises at least one or more of the following: data corresponding to an amount of bytes in a session, data corresponding to arrival times of packets in a session, data corresponding to identifiers of one or more source or destination computers, data corresponding to a first segment of a flow, data corresponding to a time elapsed between two flows in a session, data corresponding to a mean size of packets in a session, or data corresponding a distribution of characteristics of packets in a session.

18. The computer-implemented method of claim 12, wherein data items in the one or more relay data structures that are older than an expiration time are removed from the one or more relay data structures.

19. A computer program product embodied on a non-transitory computer readable medium, the non-transitory computer readable medium having stored thereon a sequence of instructions which, when executed by a processor causes the processor to execute a method for detecting malicious relay communication data flows between a plurality of computers, the method comprising:
    labeling network traffic that is generated by a plurality of hosts into one or more session datasets;
    extracting relay metadata from the one or more session datasets;
    categorizing the one or more session datasets as data items in one or more relay data structures corresponding to one or more known relay communication patterns using the relay metadata;
    correlating the data items into the one or more known relay communication patterns by matching the data items to both a flow direction and a statistical description of known relay communication patterns, the known relay communication patterns corresponding to types of relay behavior communication patterns registered in a database as correlating to communications from a control computer to other hosts through a relay computer; and
    generating reporting output data if a number of data items in the one or more relay data structures exceeds a limit.

20. The computer program product of claim 19, wherein session dataset categorization is independent of a direction of the malicious relay communication data flows.

21. The computer program product of claim 19, wherein categorizing the one or more session datasets as data items in one or more relay data structures uses label constraints and flow direction constraints.

22. The computer program product of claim 21, wherein at least one of the one or more relay data structures corresponds to the label constraints and the flow direction constraints that describe a first session initiated by the control computer and directed to the relay computer and a second session initiated by the relay computer and directed to a destination computer.

23. The computer program product of claim 21, wherein at least one of the one or more relay data structures corresponds to the label constraints and the flow direction constraints that describe a first session initiated by a destination computer and directed to the relay computer and a second session initiated by the relay computer and directed to the control computer.

24. The computer program product of claim 21, wherein at least one of the one or more relay data structures corresponds to the label constraints and the flow direction constraints that describe a first session initiated by the control computer and directed to the relay computer and a second session initiated by a destination computer and directed to the relay computer.

25. The computer program product of claim 21, wherein at least one of the one or more relay data structures corresponds to the label constraints and the flow direction constraints that describe a first session initiated by the relay computer and directed to the control computer and a second session initiated by the relay computer and directed to a destination computer.

26. The computer program product of claim 19, wherein the relay metadata comprises one or more of the following: data corresponding to an amount of bytes in a session, data corresponding to arrival times of packets in a session, data corresponding to identifiers of one or more source or destination computers, data corresponding to a first segment of a flow, data corresponding to a time elapsed between two flows in a session, data corresponding to a mean size of packets in a session, and data corresponding a distribution of characteristics of packets in a session.

27. The computer program product of claim 19, wherein data items in the one or more relay data structures that are older than an expiration time are removed from the one or more relay data structures.

* * * * *